(12) United States Patent
Yen et al.

(10) Patent No.: US 9,948,529 B2
(45) Date of Patent: Apr. 17, 2018

(54) MOBILE MANUFACTURING MANAGEMENT AND OPTIMIZATION PLATFORM

(71) Applicant: Chun-Tai Yen, Taipei (TW)

(72) Inventors: Chun-Tai Yen, Taipei (TW); Hung-An Kao, Taipei (TW); Chih-Chiang Kao, Taoyuan (TW)

(73) Assignee: Chun-Tai Yen, Taipei (TW)

( * ) Notice: Subject to any disclaimer, the term of this patent is extended or adjusted under 35 U.S.C. 154(b) by 200 days.

(21) Appl. No.: 15/160,211

(22) Filed: May 20, 2016

(65) Prior Publication Data
US 2017/0339032 A1   Nov. 23, 2017

(51) Int. Cl.
| G06F 15/16 | (2006.01) |
| H04L 12/26 | (2006.01) |
| H04L 29/08 | (2006.01) |
| H04L 12/24 | (2006.01) |
| H04W 12/04 | (2009.01) |
| H04W 4/02 | (2018.01) |

(52) U.S. Cl.
CPC ............ *H04L 43/04* (2013.01); *H04L 41/22* (2013.01); *H04L 67/1002* (2013.01); *H04L 67/18* (2013.01); *H04W 4/02* (2013.01); *H04W 12/04* (2013.01)

(58) Field of Classification Search
CPC ................................ H04W 4/02; H04L 67/18
See application file for complete search history.

(56) References Cited

U.S. PATENT DOCUMENTS

| 7,849,184 B1* | 12/2010 | Kahn | G06F 11/3055 |
| | | | 709/224 |
| 8,649,883 B2* | 2/2014 | Lu | H04L 12/2807 |
| | | | 700/22 |
| 2014/0032722 A1* | 1/2014 | Snow | G06F 9/4445 |
| | | | 709/220 |
| 2014/0229389 A1* | 8/2014 | Pantaleano | G06Q 50/01 |
| | | | 705/300 |
| 2016/0027307 A1* | 1/2016 | Abhyanker | G08G 1/005 |
| | | | 701/117 |
| 2016/0072750 A1* | 3/2016 | Kass | H04L 51/14 |
| | | | 709/206 |
| 2016/0170716 A1* | 6/2016 | Allsbrook | G06F 8/35 |
| | | | 717/104 |
| 2016/0314299 A1* | 10/2016 | Almer | G06F 21/6218 |
| 2017/0264511 A1* | 9/2017 | Myadam | H04L 43/045 |

* cited by examiner

*Primary Examiner* — Hieu Hoang
(74) *Attorney, Agent, or Firm* — Rosenberg, Klein & Lee

(57) ABSTRACT

A platform for remote management of production and optimization of manufacturing efficiency by utilizing a cloud server to provide data obtained from sensors on production machines to mobile devices. The service box is coupled to sensors on a production machine. The service box receives appropriate data from the sensors and transfers the data to a cloud server in real-time. The data is analyzed and appropriate information is sent to a mobile device in order for personnel in a location remote from the facility to observe production data and perform management functions. A message broker is provided between the mobile device and the cloud server to facilitate information transfers and to balance the data transfer load according to network or device capabilities and statuses.

17 Claims, 14 Drawing Sheets

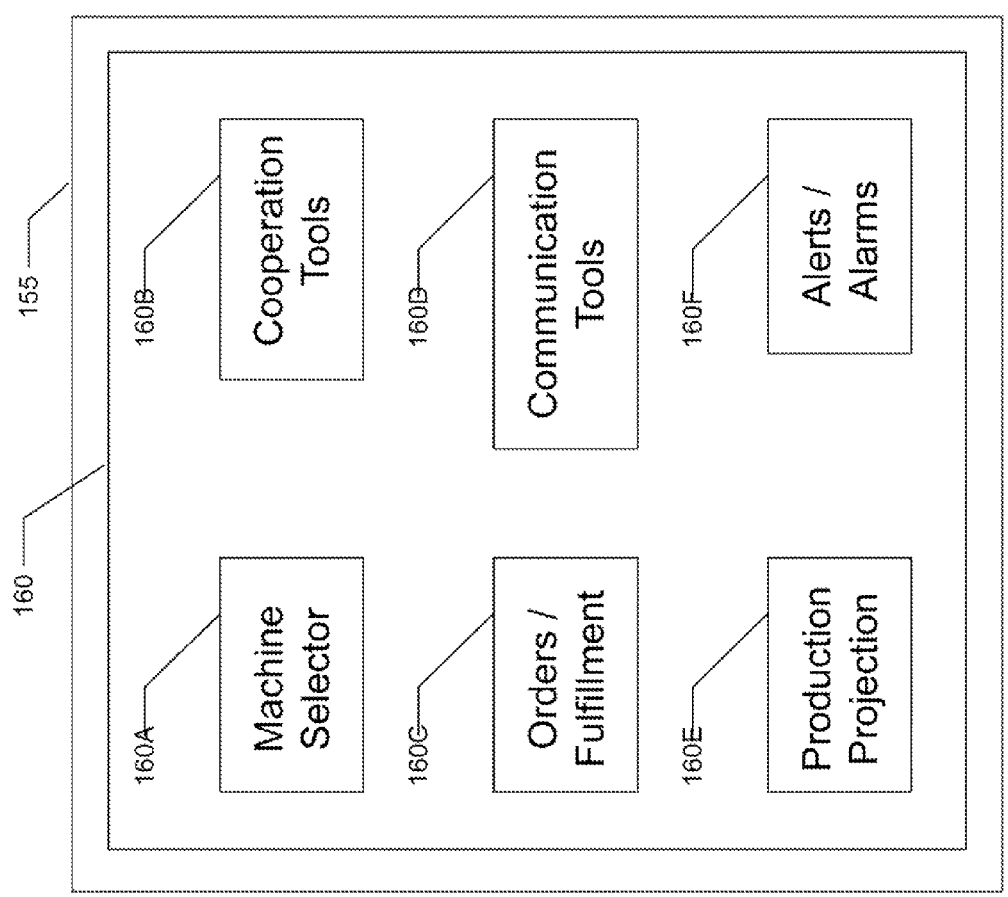

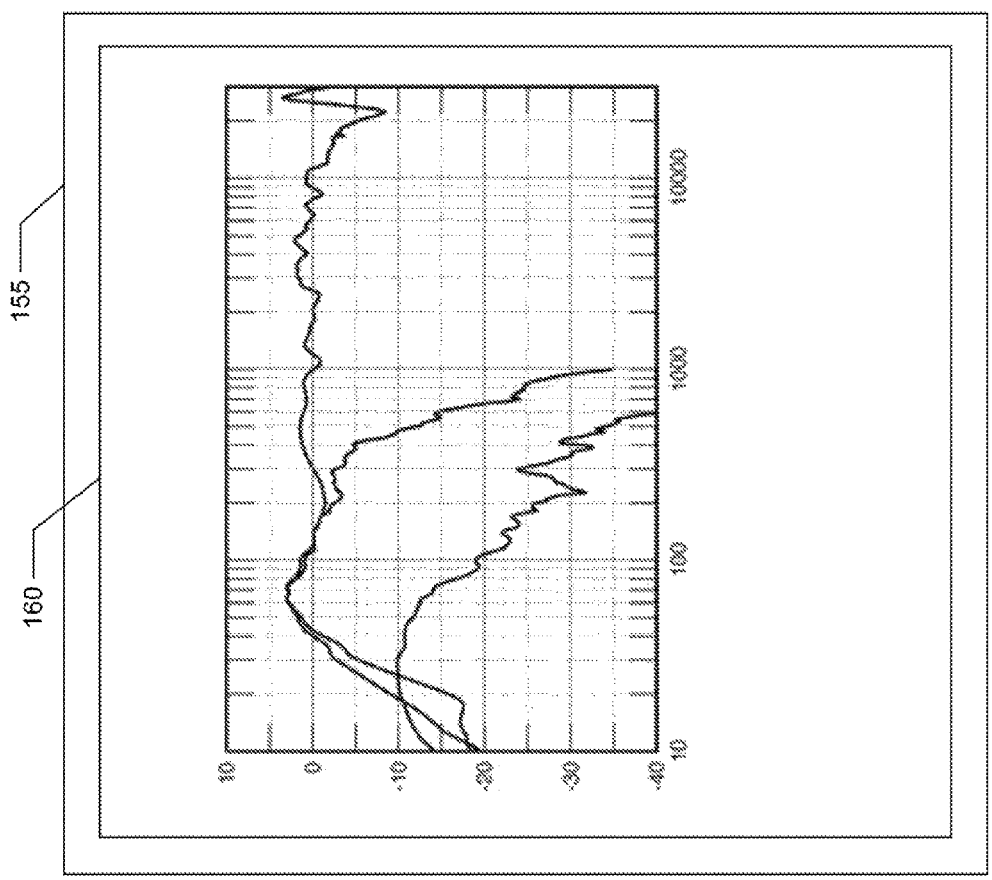

MOBILE MANUFACTURING MANAGEMENT AND OPTIMIZATION PLATFORM

BACKGROUND OF THE INVENTION

Field of the Invention

The present invention relates to production systems. More specifically, the present invention discloses a platform and method for remote management of production and optimization of manufacturing efficiency by utilizing a service box to provide data obtained from sensors on production machines and providing data and information to mobile devices in order to perform efficiency and throughput analysis and improve management of manufacturing facilities.

Description of the Prior Art

Manufacturing factories use various machines to produce products. The performance of the machines directly affects the cost of production and the profit available when selling the products. In order to improve machine performance traditional factories employ numerous technicians to maintain the machines.

Additionally, numerous managers must be on site at the factory during production in order to oversee the workers operating the machines, the technicians, and production.

However, various management personnel are away from the facility at times in order to visit customers or suppliers or attend conferences or training. While away the manager is unable to get an accurate status of the current production situation and can not proactively manage production. As a result, production volume, quality, and efficiency are adversely affected thereby increasing production costs and lowering manufacturing efficiency.

Therefore, there is need for an efficient system for remotely optimizing manufacturing efficiency by using a platform to obtain data from production machines and providing information to mobile devices in order to improve the efficiency and efficacy of manufacturing management.

SUMMARY OF THE INVENTION

To achieve these and other advantages and in order to overcome the disadvantages of the conventional method in accordance with the purpose of the invention as embodied and broadly described herein, the present invention provides a platform and method for remotely managing production and optimizing manufacturing and increasing production efficiency by utilizing a service box to provide data obtained from sensors on production machines and providing information to mobile devices in order to improve management of manufacturing facilities and optimize production and profit.

Utilizing the mobile manufacturing management optimization platform of the present invention provides means for manufacturing management personnel to remotely obtain real-time status and production data on a mobile device and also perform tasks and interactions with factory equipment and personnel via the mobile device while they are away from the production facility location.

The platform and method for optimizing manufacturing of the present invention comprises a service box, an application server, an agent server, a cloud server and a mobile device. The service box comprises a hardware box with electronic circuits, firmware, and software. The service box is coupled to controllers and sensors on a production machine. The service box requests and receives appropriate and accurate data from the controllers and sensors and transfers the data to the cloud server in real-time. The collected data is continuously monitored and analyzed.

The sensors, including controllers, comprise, for example, programmable logic controllers (PLC), computer numerical control (CNC) controllers, pressure sensors, power sensors, vibration sensors, temperature sensors, acoustic sensors, global positioning system (GPS) sensors, and enterprise resource planning (ERP)/manufacturing execution systems (MES) information technology (IT) systems. The service box is configurable to connect with the desired controllers and sensors and receive the desired data.

The application server comprises an application market comprising a plurality of analysis tools and management applications that are in development or have been completed by application designers and programmers and published on the application server. An agent server comprises a plurality of analysis tools and management tools that have been downloaded from the application server and available for direct use on the agent server or for download to the cloud server. The analysis tools and management tools comprise applications that analyze controller and sensor data and produce effective results to manage production efficiency and maximize overall equipment effectiveness. The analysis and management tools comprise, for example, tools for troubleshooting, production scheduling, quality control, health diagnosis, utilization magnifier, and energy monitoring. The cloud server utilizes the analysis tools and management tools available on the agent server or available directly on the cloud server with the controller and sensor data received in real-time from the service box.

The mobile device comprises, for example, a mobile phone or a portable computer, and comprises a service dashboard for displaying an efficient visualization of the various results of the analysis tools and management tools provided by the cloud server. The user of the mobile device effectively monitors and administrates various aspects of production via the service dashboard and communicating with the cloud server while the user is located at a location remote from the production facility.

As a result, the present invention effectively and efficiently monitors, analyzes, predicts, and manages production processes to optimize manufacturing by increasing machinery and production efficiency to lower costs and increase profits even when a user is not present at the factory.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 11A is a drawing illustrating a service dashboard on a mobile device of a mobile manufacturing management and optimization platform according to an embodiment of the present invention;

FIG. 11B is a drawing illustrating a service dashboard on a mobile device of a mobile manufacturing management and optimization platform according to an embodiment of the present invention;

DESCRIPTION OF THE PREFERRED EMBODIMENTS

Figure 1:
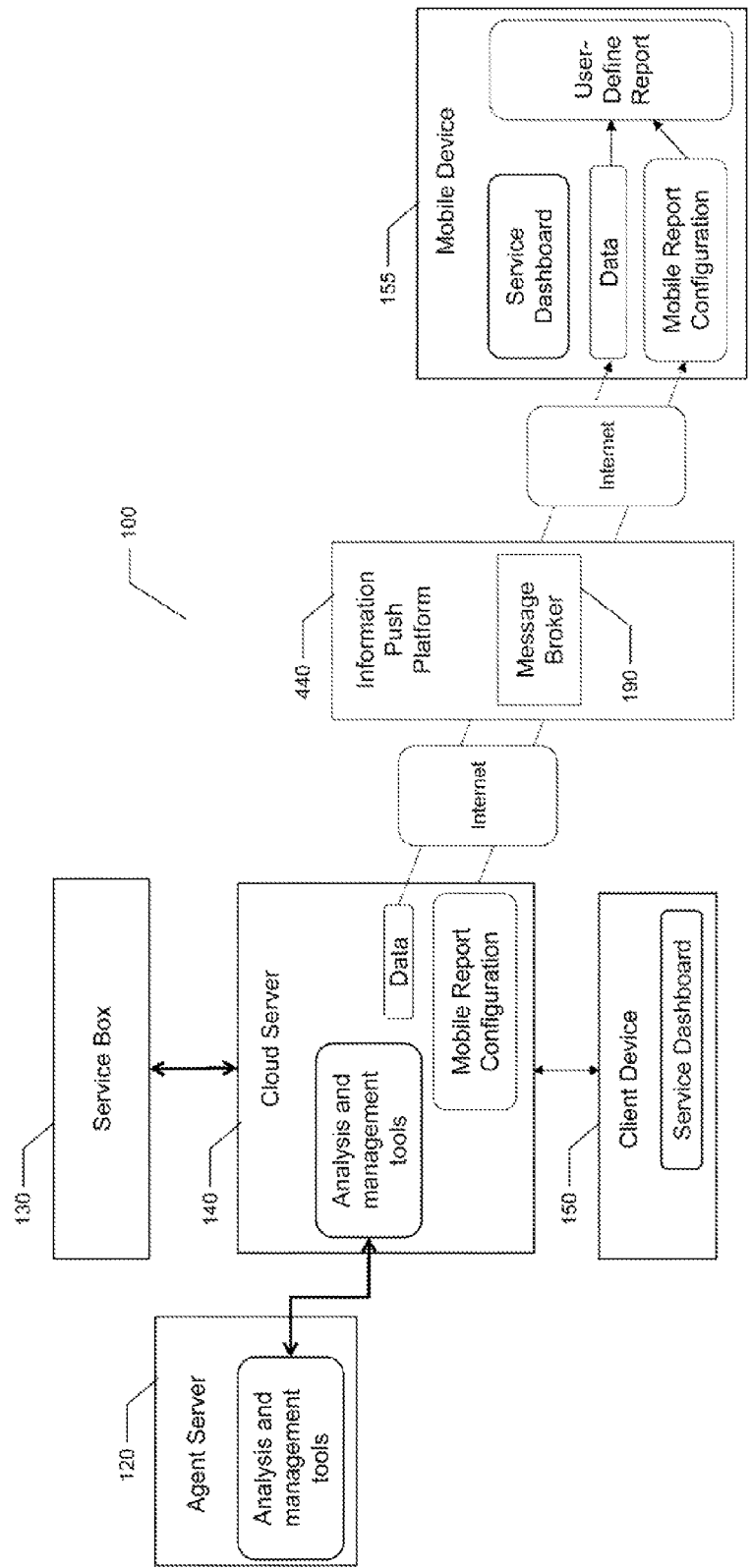
FIG. 1 is a drawing illustrating a mobile manufacturing management and optimization platform according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Figure 2:
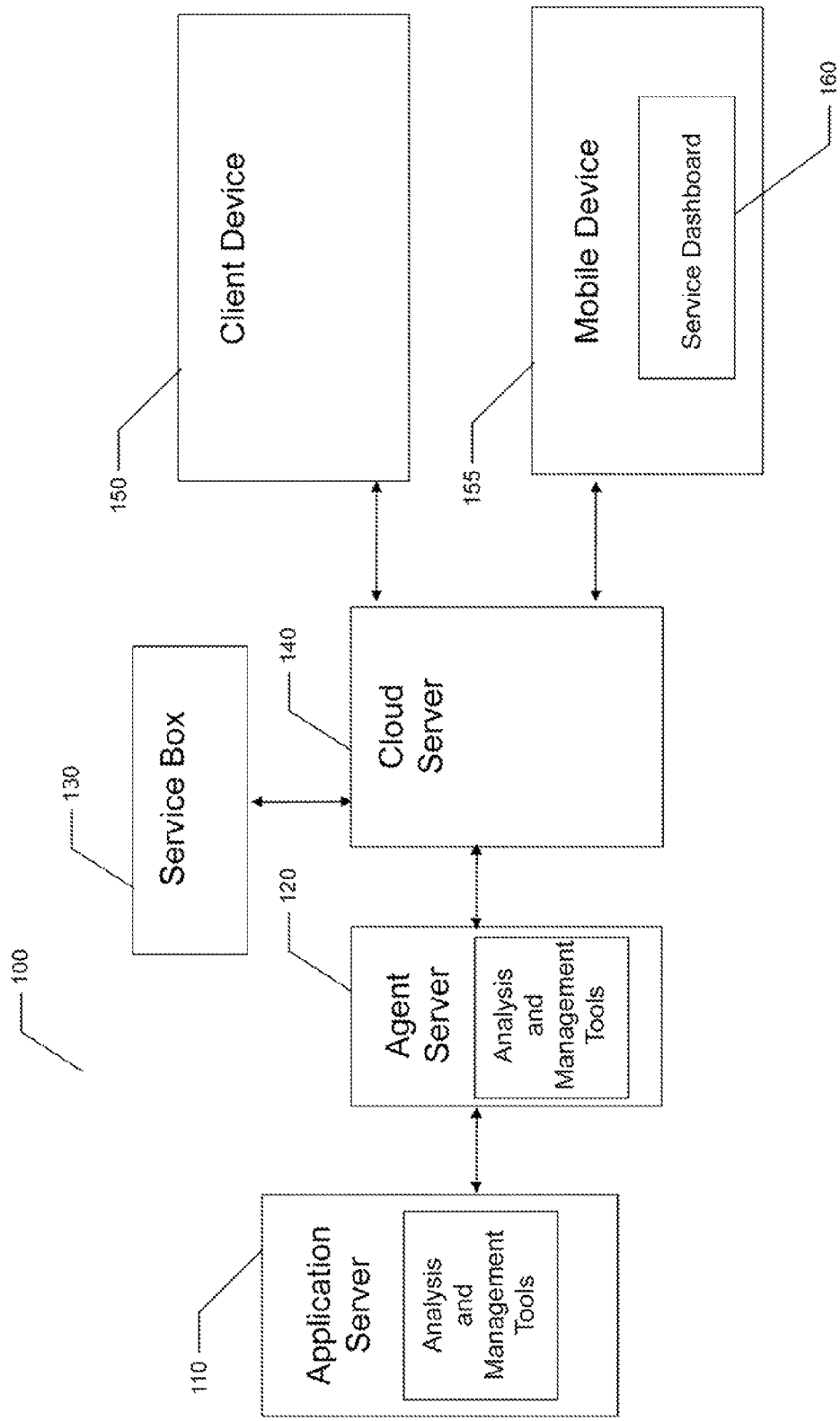
FIG. 2 is a drawing illustrating a mobile manufacturing management and optimization platform according to an embodiment of the present invention.

Referring to FIG. 1 and FIG. 2, the mobile manufacturing management and optimization platform 100 comprises an agent server 120, a service box 130, a cloud server 140, a client device 150, a mobile device 155, an application server 110, and an information push platform 440 with a message broker 190.

The agent server 120 connects with the application server 110 and the cloud server 140. The service box 130 connects with the cloud server 140 and sensors of a production machine. The cloud server connects with the agent server 120, the service box 130, the client device 150, the information push platform 440, and the mobile device 155.

The connections between the application server 110, the application server 120, the service box 130, the cloud server 140, the information push platform 440, and the client device 150 comprise a wireless network, a wired network, or a combination of wireless networks and wired networks.

The application server 110, the application server 120, the cloud server 140, the information push platform 440, and the client device 150 comprise servers, computers, tablets, smart phones, or other electronic devices capable of connecting to the platform 100.

The mobile device 155 comprises a mobile phone, a portable computer, or a tablet. The cloud server connects with the mobile device 155 via the internet.

The application server 110 comprises analysis and management tool applications that are still in development or have been completed and are available for distribution. Developers utilize the application server 110 while creating and programming the analysis and management tools. When the analysis and management tools are ready for distribution, the analysis and management tools are published on the application server 110 and the agent server 120 is notified. The agent server 120 connects with the application server 110 to access and download the published analysis and management tools.

The analysis and management tools comprise, for example, tool condition monitoring and analysis, tools for data acquisition, health indicator extraction and selection, health assessment, visualization, performance prediction, quality analysis, projection, inventory, equipment effectiveness, monitoring and production, troubleshooting, production scheduling, quality control, health diagnosis, utilization magnifier, energy monitoring, knowledge management, data analysis, system management, customer management, remote monitoring, technical documents, service management, scheduling, and employee management.

The service box 130 comprises a hardware box with a microprocessor, a non-transitory memory, electronic circuits, firmware, software, and input/output connections. The service box 130 is coupled to controllers and sensors on a production machine. The service box 130 requests and receives appropriate and accurate data from the controllers and sensors and transfers the data to the cloud server 140 in real-time.

The controllers and sensors comprise, for example, programmable logic controllers (PLC), computer numerical control (CNC) controllers, pressure sensors, power sensors, vibration sensors, temperature sensors, acoustic sensors, global positioning system (GPS) sensors, and enterprise resource planning (ERP)/manufacturing execution systems (MES) information technology (IT) systems. The service box 130 is configurable to connect with the desired controllers and/or sensors and receive the desired data.

The cloud server 140 receives the sensor data from the service box 130 in real-time. The cloud server 140 is also capable of reconfiguring which sensors the service box 130 is connected to. The cloud server 140 comprises a microprocessor, a non-transitory memory, and a plurality of analysis tools and management tools that have been provided by the agent server 120. The cloud server 140 utilizes the analysis tools and management tools available on the agent server 120 or available directly on the cloud server 140 with the sensor data received in real-time from the service box 130. In an embodiment of the present invention the analysis and management tools are locally stored and executed on the cloud server 140. In another embodiment the analysis and management tools are stored and executed on the agent server 120.

The mobile device 155 comprises a service dashboard 160 for displaying an efficient visualization of the various results of the analysis tools and management tools provided by the cloud server 140. The user of the mobile device 150 effectively monitors and administrates various aspects of production via the service dashboard 160 and communicating with the cloud server 140.

In addition to monitoring, the user of the mobile device 150 is provided with advanced tools and capabilities to directly control aspects of production while being located, in a location remote from the production facility. In order to facilitate and provide these advanced tools and capabilities and more, the present invention comprises a mobile management application installed and operating on the mobile device 155.

For example, the user of the mobile device 150 can notify personnel directly from the mobile management application, can send email or messages or place calls to other users, can make notes directly on graphs, charts, data lists, etc. and share these details with others, can initiate alarm on machine, client device, or other mobile device, can utilize a cooperative white board with other users, can select cameras located in the factory and view real-time video from the selected cameras, etc.

The information push platform 440 is disposed between the cloud server 140 and the mobile device 155. The information push platform 440 connects to the cloud server 140 and the mobile device 155 via the internet. The inilomiation push platform 440 with the message broker 190 facilitates data and information transfers between the cloud server 140 and the mobile device 155.

In an embodiment of the present invention the service box 130 is implemented as service box software and is deployed on a server, for example the cloud server 140. The service box software and the server connect to the machine controllers and sensors via a wireless connection. In this embodiment the installation is simplified and maintenance costs are reduced.

In another embodiment of the present invention the service box software and the server connect to the machine controllers and sensors via a wired connection.

Refer to FIGS. 11A and 11B. In operation, the service box coupled to the machinery sensor or controller receives appropriate data from the sensor(s). This data comprises, for example, power consumption, temperature, viscosity, noise level, vibration, material quantity or volume, product count, etc. The service box transmits the sensor data to the cloud server in real-time and the transmitted sensor data is received by the cloud server. The cloud server utilizes the analysis and management tools on the data. The results from the analysis and management tools on the data are provided to the mobile device 155 by the cloud server. The results are displayed in the service dashboard 160 of the mobile management application on the mobile device 155.

The service dashboard 160 on the mobile device 155 provides a means for a user to access analysis results and data provided by the cloud server. The service dashboard 160 comprises, for example, a display of available tools, reports, graphs, charts, maps, histories, logs, schedules, quantities, inventories, documents, orders, or projections. The service dashboard 160 displays icons of available tools and data accessible to the user of the mobile device 155. Clicking on one of the icons brings up a visualization of the selected icon. For example, if the user selects an icon for production quantity the service dashboard 160 displays a graph of the current production volume as well as showing the past volume history. In this way, the user can easily see valuable information in real-time rather than reading through a printed report.

The mobile management application and the service dashboard 160 are configurable for individual users and only appropriate tools and data are displayed for each user. This prevents information overload and confusion by simplifying the use of the platform. Also, the service dashboard 160 is configured to display appropriate data in real-time on the mobile device 155. For example, a manager in another country will see a real-time graph of specific statuses on their mobile device 155 and not be confused by unnecessary data.

Figure 3:
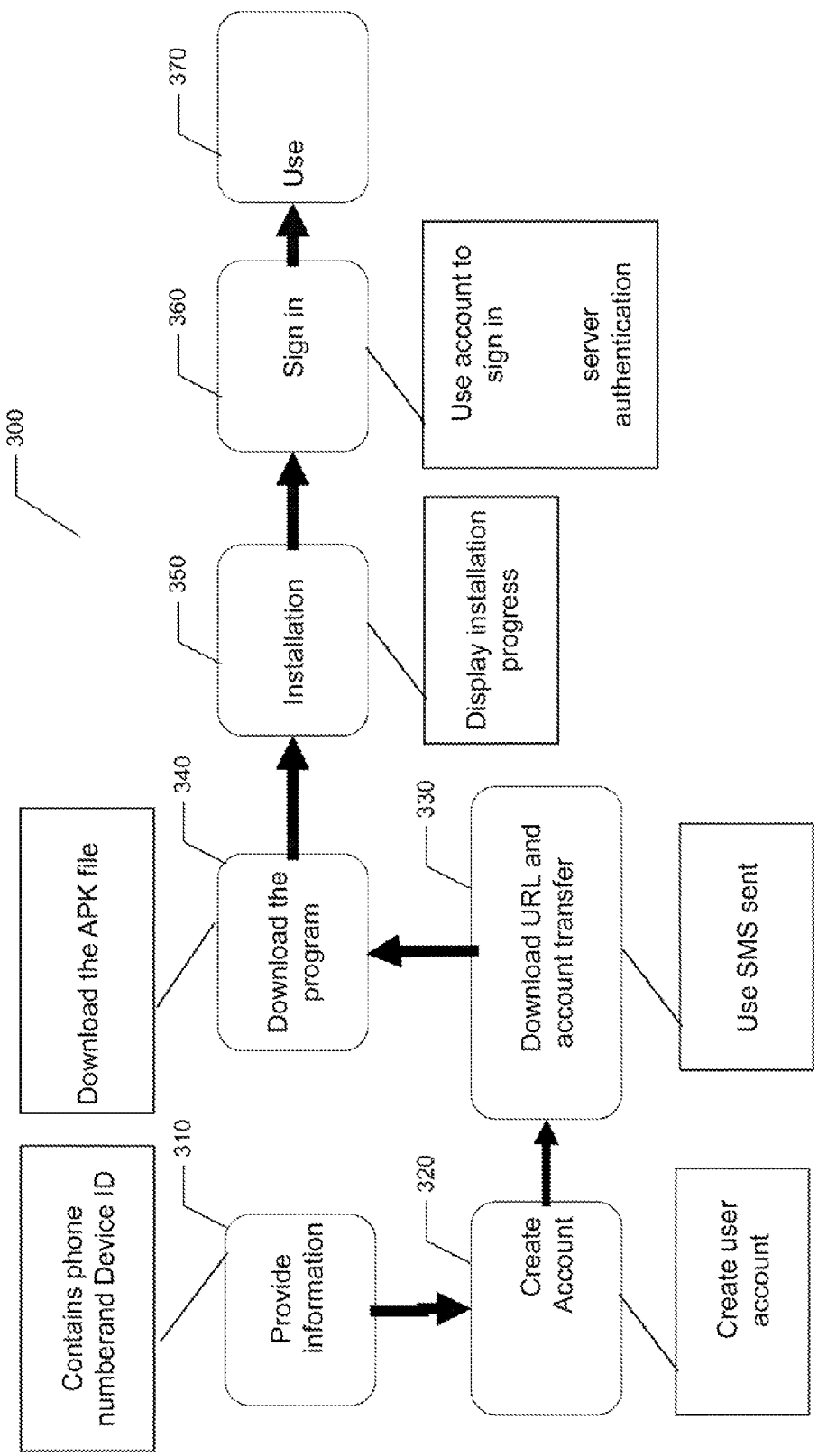
FIG. 3 is a drawing illustrating a client download process of a mobile manufacturing management and optimization platform according to an embodiment of the present invention.
Figure 4:
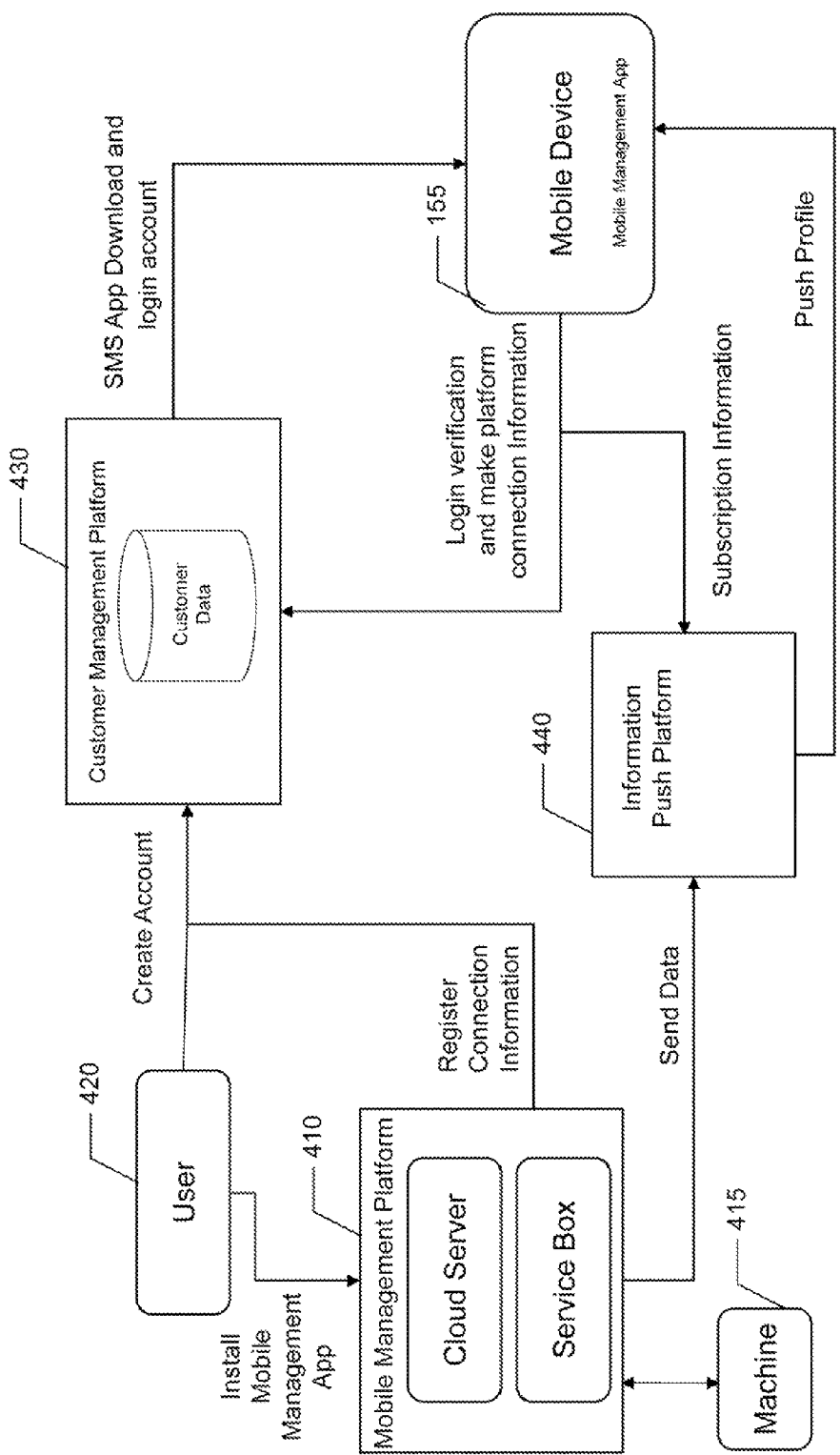
FIG. 4 is a drawing illustrating an operation flow diagram of a mobile manufacturing management and optimization platform according to an embodiment of the present invention.

Refer to FIG. 3 and to FIG. 4. In order to utilize the mobile manufacturing management and optimization platform of the present invention from their mobile device 155, the user 420 performs a client download process 300.

The user 420 initiates creation of an account by contacting a customer management platform 430 via the mobile device 155. The user 420 inputs various user data related to establishing the account 310 and the user data is stored on the customer management platform 430 and the account is created 320. The information provided comprises the phone number and device identification of the mobile device 155. This information is utilized in order to authenticate or authorize the user when creating an account or logging in.

The user 420 then receives a message containing a URL download link 330, for example an email or an SMS, from the customer management platform 430. The user 420 via the mobile device 155 downloads the mobile management application 340. The mobile management application is then installed 350 and the installation progress is displayed.

Afterward, the user via the mobile device 155 signs in 360 and uses 370 the mobile management application to receive data from and communicate with a mobile management platform 410.

Additionally, the user installs a mobile management application on the mobile management platform 410. The mobile management platform 410 comprises a cloud server and a service box. The connection information for the mobile management application of the mobile management platform 410 is then registered with the customer management platform 430. The mobile management application is downloaded and installed on the mobile device 155.

A user of the mobile device 155 connects with the customer management platform 430 and logs in. The log in is verified and the subscription information with platform connection information is provided to an information push platform 440. Thereafter, the mobile management platform 410 provides appropriate data collected from a machine 415 to the information push platform 440 and the information push platform 440 provides the data to the mobile device 155 for use by the mobile management application.

Figure 5:
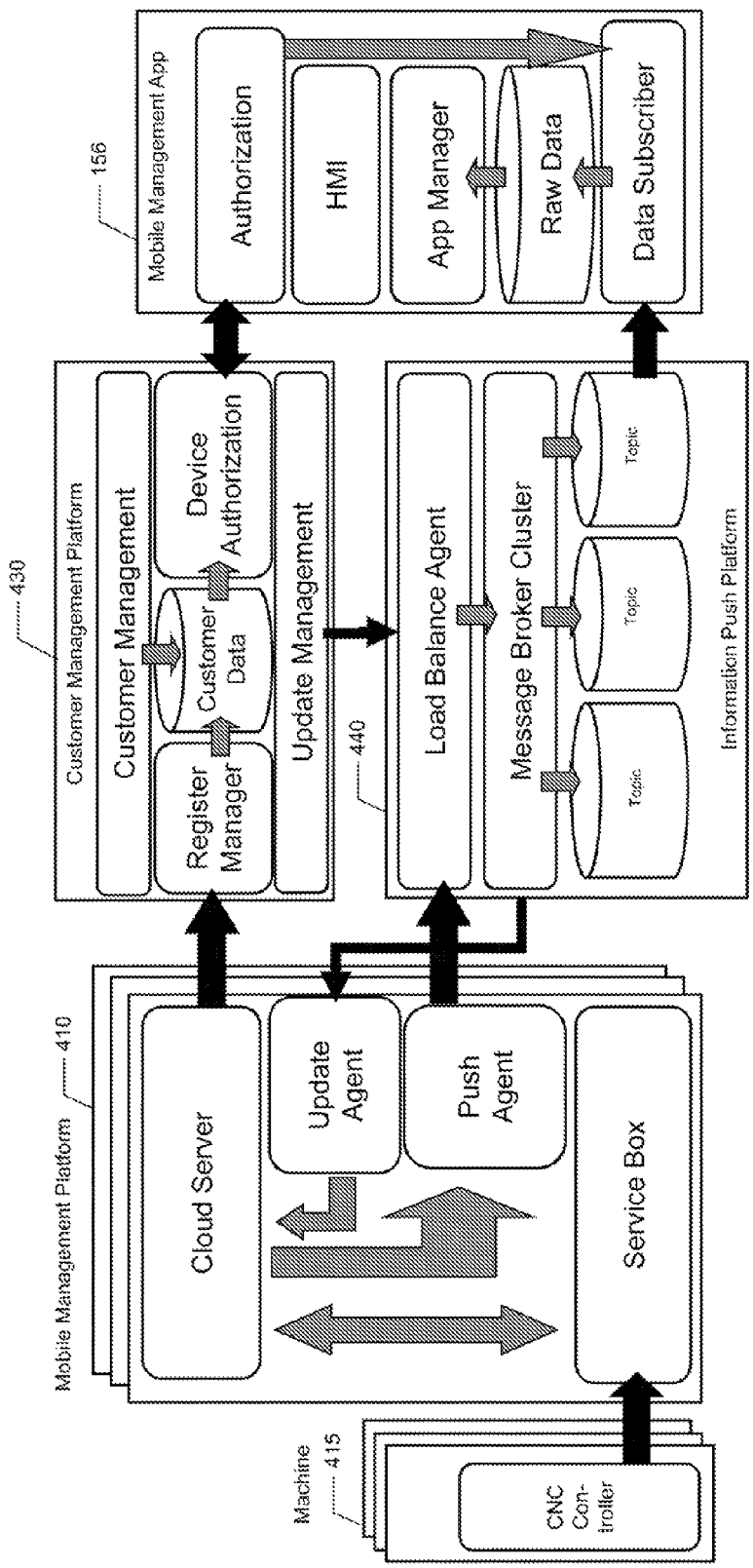
FIG. 5 is a drawing illustrating an operation chart of a mobile manufacturing management and optimization platform according to an embodiment of the present invention.

Refer to FIG. 5, which is a drawing illustrating an operation chart of a mobile manufacturing management and optimization platform according to an embodiment of the present invention.

The mobile management platform 410 comprises a cloud server, a service box, an update agent, and a push agent. The service box connects with a sensor of a machine 415. Data received from the sensor by the service box is sent to the cloud server.

The customer management platform 430 comprises a customer management module for managing customers and customer data, a registration manager for managing user registration, a device authorization module for performing device and user authorization processes, an update management module for managing updates, and a customer data database for storing customer data.

The information push platform 440 comprises a load balance agent, a message broker cluster, and topic data. The load balance agent communicates with the update management module and the message broker cluster and the push agent. The message broker cluster communicates with the topic data and the update agent.

The load balance agent and the message broker control the speed and volume of data transmission between the cloud server and the mobile device. By monitoring various aspects such as, for example, network speed, bandwidth, device speed, data type, etc., the information push platform 440 notifies the cloud server to speed up or slow down data transmission rate or increase or decrease data volume. In this way, communication between the cloud server and the mobile device is continually optimized.

The mobile management application 156 comprises an authorization module, a hardware interface module, an application manager, data subscriber module, and data. The data subscriber module receives topic data and the authorization module communicates with the device authorization module.

Figure 6:
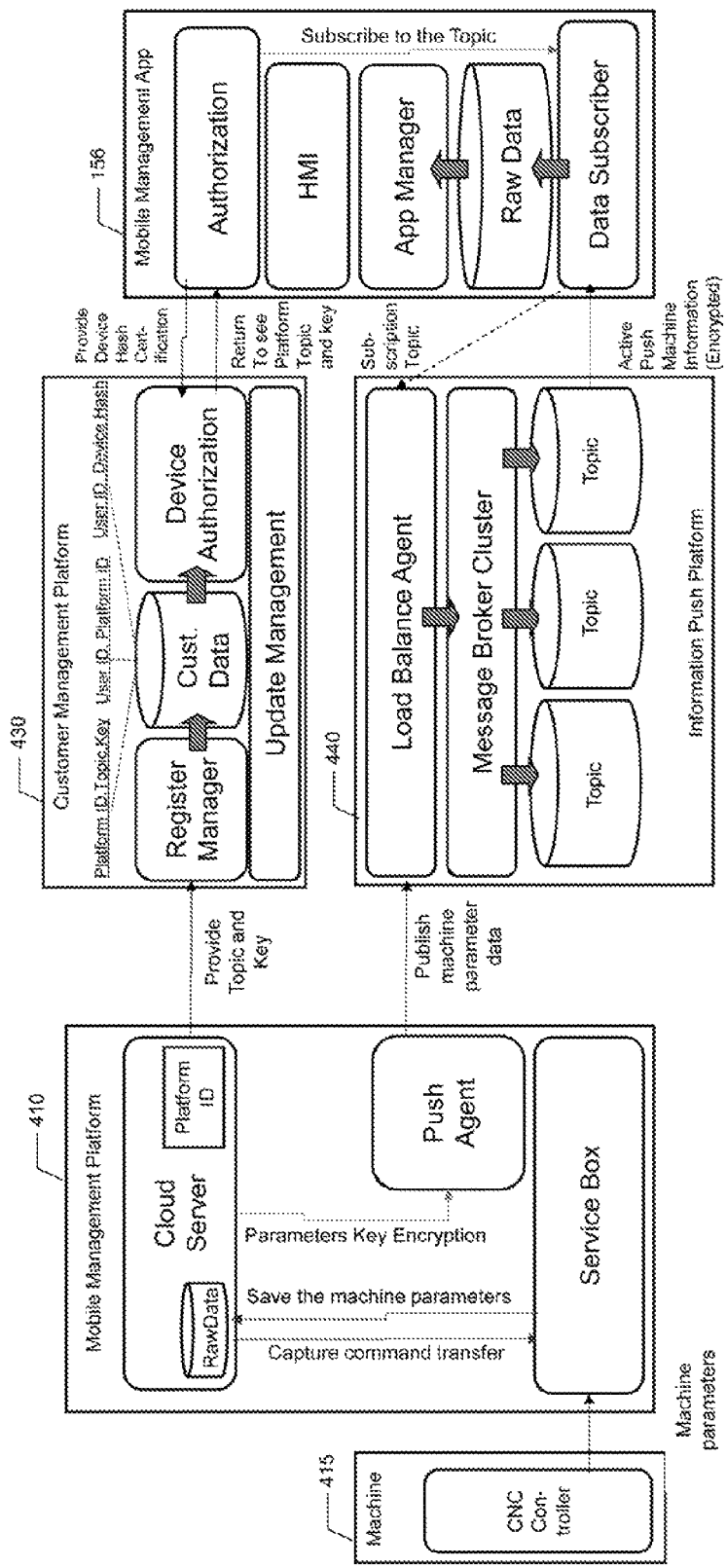
FIG. 6 is a drawing illustrating data monitoring applications of a mobile manufacturing management and optimization platform according to an embodiment of the present invention.

Refer to FIG. 6, which is a drawing illustrating data monitoring applications of a mobile manufacturing management and optimization platform according to an embodiment of the present invention.

To elaborate on the description regarding FIG. 5, the cloud server instructs the service box to capture and transfer sensor/machine data. The sensor on the machine 415 sends machine parameters to the service box of the mobile management platform 410. The cloud server saves the machine parameters received from the service box. Additionally, the cloud server encrypts the parameters key and sends it to the push agent and provides a data topic and the key to the register manager of the customer management platform 430. The push agent publishes the machine parameter data to the load balance agent of the information push platform 440.

The register manager provides data received from the cloud server to the customer data database. The customer data database comprises data such as, for example, platform ID, topic key, user ID, device ID, device hash, etc. The data is used by the device authorization module to authenticate and authorize a mobile device via the mobile management application 156.

When the mobile management application has been authorize, the authorization module notifies the data subscriber to subscribe to a topic. The data subscriber communicates to notify the load balance agent to subscribe to the topic. The load balance agent communicates to the message broker cluster to transmit the topic and the encrypted machine information is actively pushed to the data subscriber module. The application manager then accesses the receive machine information data and provides the data to the user via the service dashboard of the mobile management application.

Figure 7:
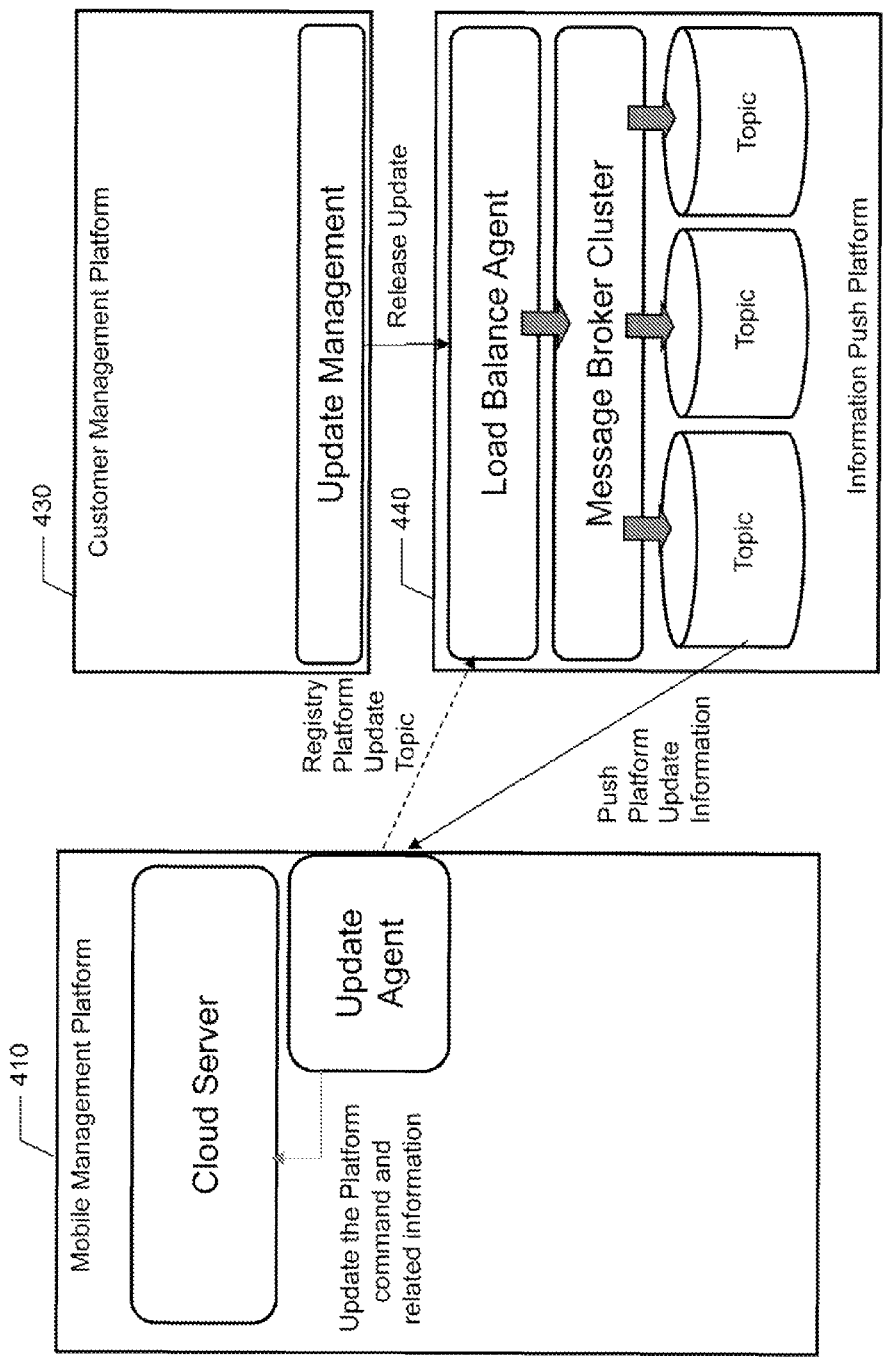
FIG. 7 is a drawing illustrating platform update applications of a mobile manufacturing management and optimization platform according to an embodiment of the present invention.

Refer to FIG. 7, which is a drawing illustrating platform update applications. In order to continually provide updates, the update agent of the mobile management platform 410 communicates with the load balance agent and topic module of the information push platform as well as with the cloud server.

Additionally, the update management module of the customer management platform 430 communicates with the load balance agent and releases updates to the load balance agent. The information push platform provides the update information to the update agent which in turn communicates with the cloud server to update the platform.

Figure 8:
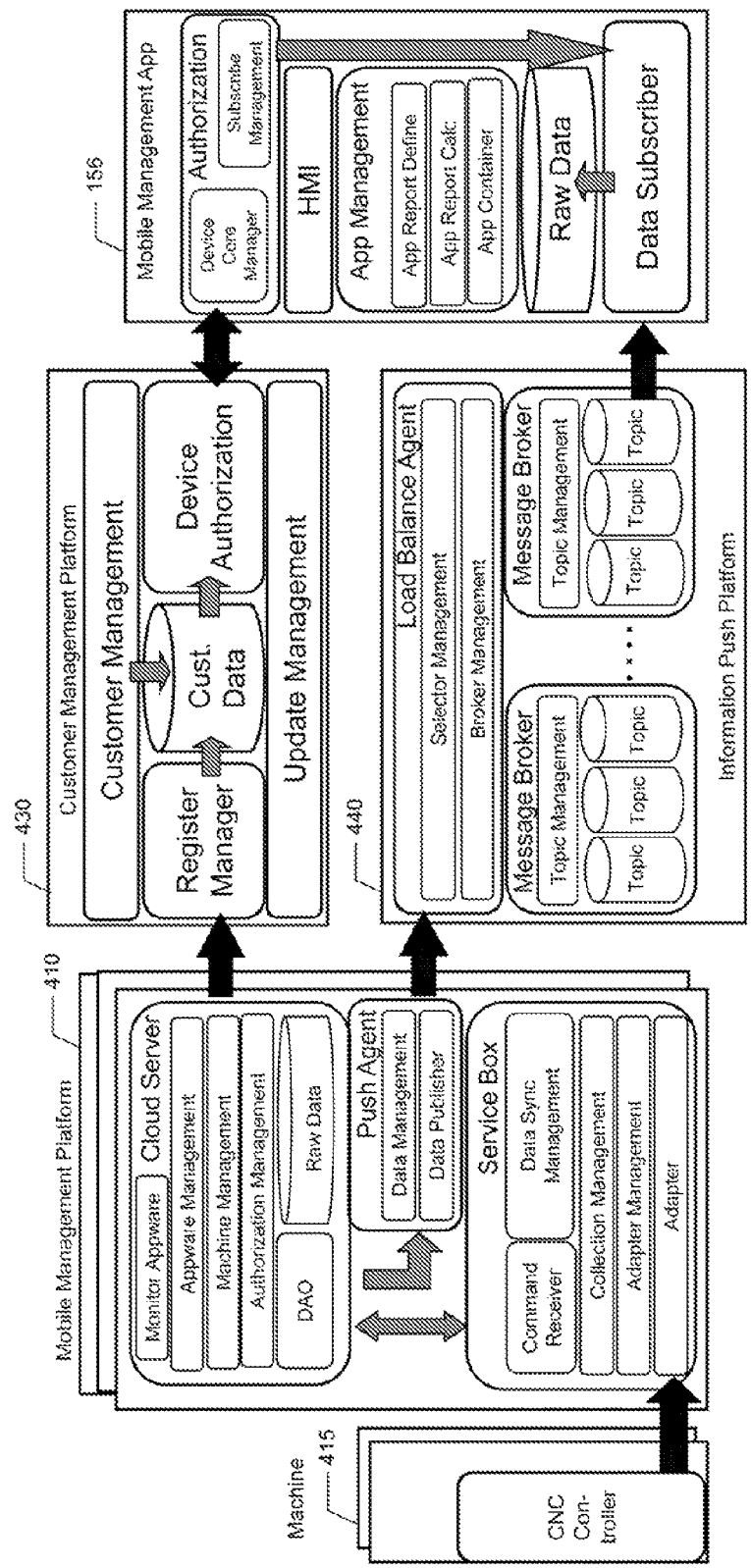
FIG. 8 is a drawing illustrating modular architecture details of a mobile manufacturing management and optimization platform according to an embodiment of the present invention.

Refer to FIG. 8, which is a drawing illustrating modular architecture details. In the embodiment illustrated in FIG. 8 the cloud server further comprises an app-ware monitor for monitoring app-ware of the cloud server, an app-ware manager for managing the app-ware, a machine manager for managing the cloud server, an authorization manager for managing authorization with the register manager, a non-transitory memory for data storage, and data access objects for interfacing with the non-transitory memory.

The service box further comprises an adapter for connecting with and receiving sensor data from the machinery sensor, a command receiver for receiving a capture command from the cloud server, a data sync manager for syncing the sensor data, a collection manager for managing collection of sensor data, and an adapter manager for managing the adapter.

The push agent further comprises a push data manager for managing push data and a data publisher for publishing the push data to the load balance agent.

The load balance agent comprises a selector manager for managing selections and a broker manager for managing the message broker.

The message broker further comprises a topic manager for managing topics and a plurality of topics.

The mobile authorization module of the mobile management application further comprises a device core manager for communicating with the device authorization module and a subscribe manager for communicating with the data subscriber.

The application manager of the mobile management application further comprises a report definer for defining a report, an application report calculator for assisting the report definer to create the report, and an application container for wrapping the mobile management application.

Figure 9:
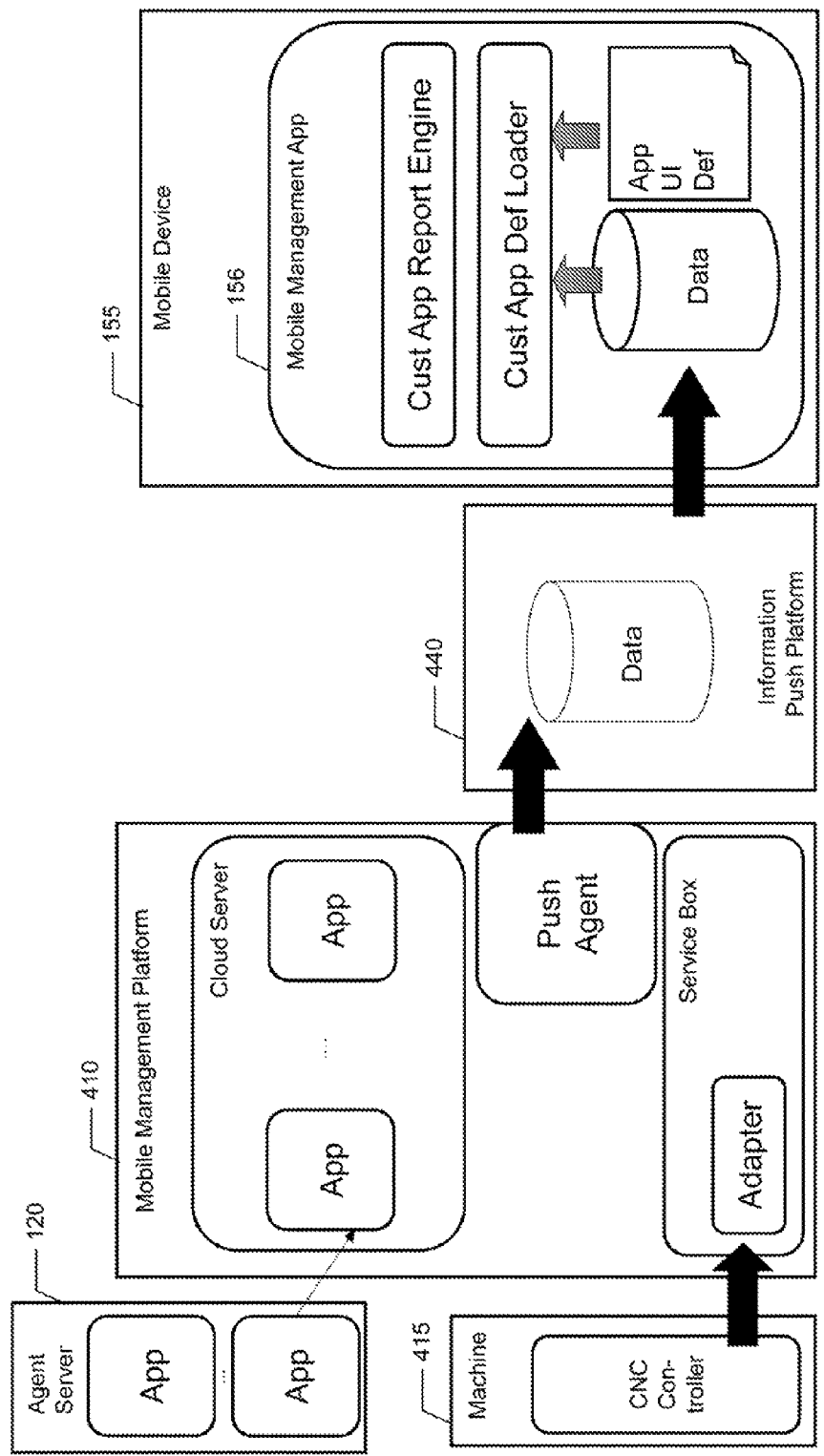
FIG. 9 is a drawing illustrating application acquisition and operation of a mobile manufacturing management and optimization platform according to an embodiment of the present invention.

Refer to FIG. 9, is a drawing illustrating application acquisition and operation.

In order to provide customized real-time data to the user of the mobile device 155 the mobile management application 156 comprises a custom application report engine, a custom application definition loader, and an application user interface definition.

Using various modules such as the custom application report engine, custom application definition loader, and the application user interface definition, the mobile management application 156 is customizable in numerous ways such as, what data a user interacts with, how the data, is presented or displayed, what data is displayed, how reports are created and displayed, how a user interacts with the data, what tools are provided to the user, how the user interface is configured, etc.

Figure 10:
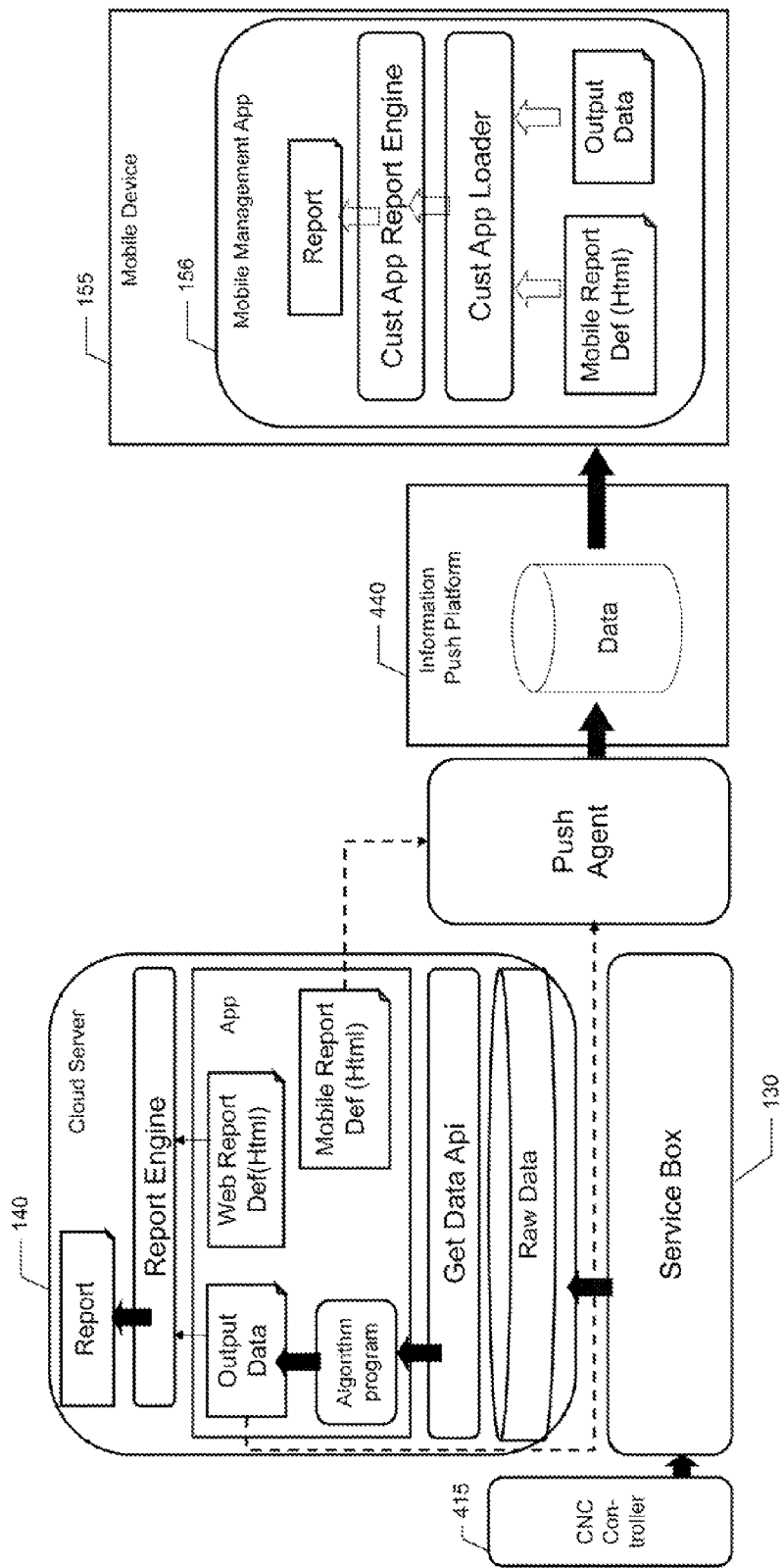
FIG. 10 is a drawing illustrating mobility rack applications of a mobile manufacturing management and optimization platform according to an embodiment of the present invention.

Refer to FIG. 10, which is a drawing illustrating mobility rack applications. In the embodiment illustrated in FIG. 10 the cloud server comprises a get data API, an algorithm program, output data, mobile report definition, web report definition, a report engine, and a report.

The service box transmits the sensor data to the cloud server. The get data API transfers appropriate data from the raw data to the algorithm program. The algorithm program outputs the resultant data which is provided to the report engine and the push agent. The report engine according to the web report definition produces the report. The mobile report definition is provided to the push agent which provides the data to the information push platform which in turns communicates with the mobile management application. The custom application loader utilizes the mobile report definition and the output data to instruct the custom application report engine to produce the customized report to the user of the mobile device 155 via the mobile management application 156.

Figure 12:
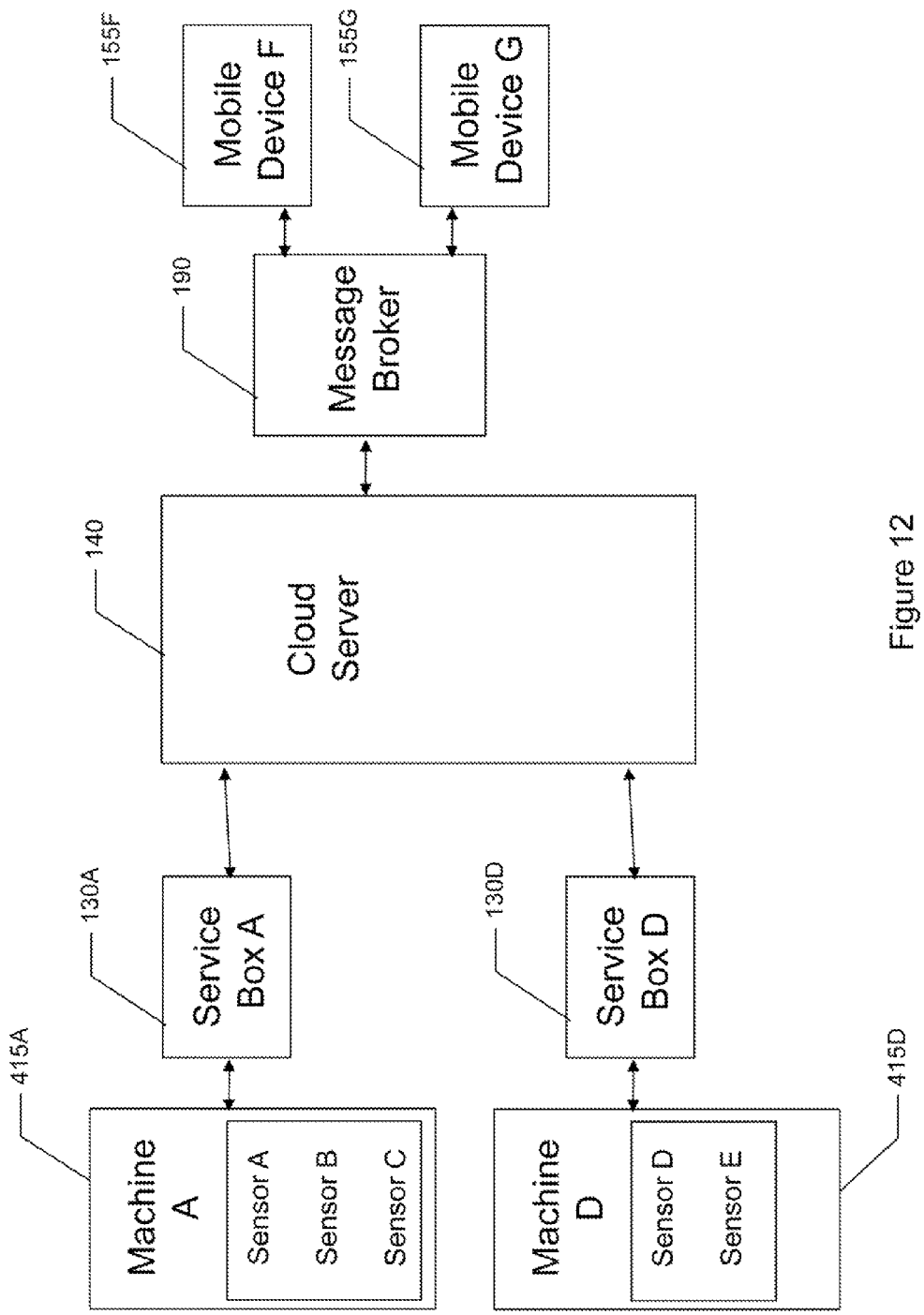
FIG. 12 is a drawing illustrating multiple service boxes of a mobile manufacturing management and optimization platform according to an embodiment of the present invention.

Refer to FIG. 12. In the embodiment illustrated in FIG. 12 a plurality of service boxes connect to the same cloud server. Service box A 130A connects with machine A 415A and receives sensor data from sensor A, sensor B, and sensor C of machine A 415A. Service box A 130A transmits the received sensor data to the cloud server 140. Service box D 130D connects with machine D 415D and receives sensor data from sensor D and sensor E of machine D 415D. Service box D 130D transmits the received sensor data to the cloud server 140.

The cloud server 140 connects with a plurality of mobile devices (mobile device F 155F and mobile device G 155G) via a message broker 190. Data such as, for example, sensor data, analysis data, management data, and machine data from both machine A 415A and machine D 415D is made available to both mobile device F 155F and mobile device G 155G or either depending on access privileges.

Figure 13:
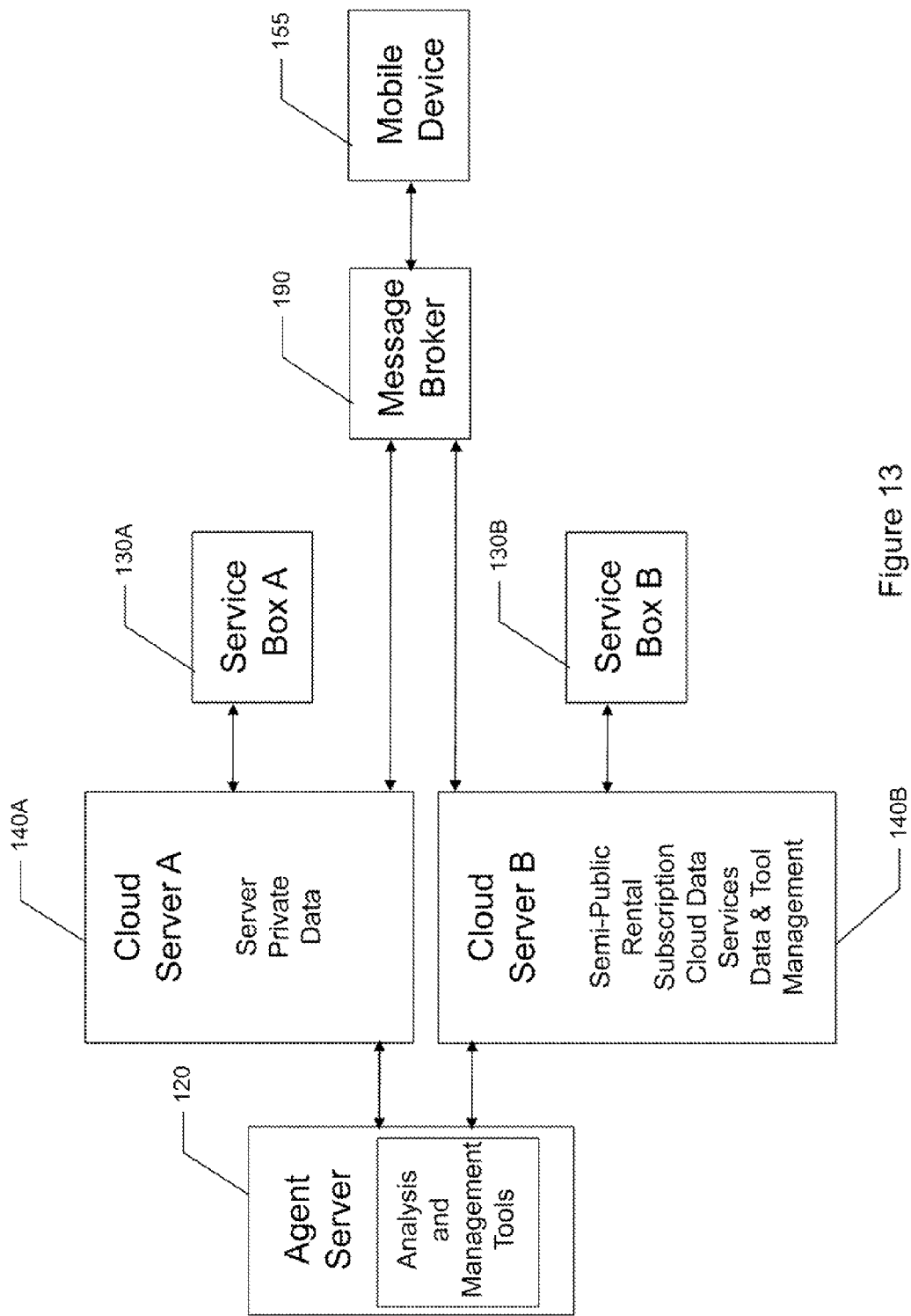
FIG. 13 is a drawing illustrating multiple cloud servers of a mobile manufacturing management and optimization platform according to an embodiment of the present invention.

Refer to FIG. 13. The present invention provides flexibility for the user by offering various configurations for the cloud server and the platform service. In the embodiment illustrated in FIG. 13, a plurality of cloud servers connect to the agent server 120. Cloud server A 140A connects with service box A 130A and cloud server B 140B connects with service box B 130B and both cloud servers 140A 140B connect to the same agent server 120.

Cloud server A 140A is configured as a private cloud server. A private cloud server comprises private data that is only accessible to the user. Cloud server A 140A connects to the agent server to download analysis and management tools. All data, for example, sensor data, production data, analysis data, and management data are kept on cloud server A 140A and not publicly available. A private cloud server such as cloud server A 140A provides a high level of security for sensitive manufacturing data for the user.

Cloud server B 140B is configured as a semi-public cloud server where some or all of the data on cloud server B 140B is available to the agent server 120. Agent server 120 provides cloud data services as well as analysis and management tool management services for cloud server B 140B. For example, the agent server 120 routinely updates the analysis and management tools, provides access to new tools, performs analysis on production data, and maintains cloud server B 140B. A semi-public cloud server such as cloud server B 140B is more economical to maintain for smaller companies or clients without a dedicated technical support team.

A message broker 190 communicates with both cloud server A 140A and cloud server B 140B to provide exchange of data and communication between a mobile device 155 and the cloud servers 140A-140B.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A mobile manufacturing management and optimization platform comprising:
  a mobile management platform comprising:
    a cloud server, the cloud server receiving sensor data from mobile manufacturing machinery sensors and using an analysis tool on the sensor data to obtain analysis data;
    an update agent; and
    a push agent;
    a customer management platform comprising a first processor for executing instructions comprising:
      a customer management module for managing customer data;
      a register manager for managing user registration via the cloud server;
      a device authorization module for authorizing a mobile device;
      an update management module for managing updates for the cloud server; and
      a customer data database for storing the customer data;
    the mobile device comprising:
      a mobile management application for communicating with the cloud server, the mobile management application comprising:
        mobile authorization instructions for interacting with the device authorization module to establish authorization of the mobile device;
        an application manager for managing settings and configuration of the mobile management application;
        a data subscriber for subscribing to topics of the analysis data; and
        a service dashboard for displaying the analysis data provided by the cloud server; and
    an information push platform comprising a second processor for executing instructions comprising:
      a load balance agent for receiving the analysis data from the cloud server via the push agent, for controlling data flow between the cloud server and the mobile device, and for receiving updates from the update management module; and
      a message broker for transmitting the subscribed topics to the data subscriber and for providing the updates to the cloud server via the update agent.

2. The mobile manufacturing management and optimization platform of claim 1, the cloud server further comprising a platform identification for providing an encrypted topic key to the register manager.

3. The mobile manufacturing management and optimization platform of claim 1, the information push platform notifying the cloud server to speed up or slow down data transmission rate or increase or decrease data volume.

4. The mobile manufacturing management and optimization platform of claim 1, the service dashboard comprising a display of available tools, reports, graphs, charts, maps, histories, logs, schedules, quantities, inventories, documents, orders, or projections.

5. The mobile manufacturing management and optimization platform of claim 1, the cloud server further comprising:
  an app-ware monitor for monitoring app-ware of the cloud server;
  an app-ware manager for managing the app-ware;
  a machine manager for managing the cloud server;
  an authorization manager for managing authorization with the register manager;
  a non-transitory memory for data storage; and
  data access objects for interfacing with the non-transitory memory.

6. The mobile manufacturing management and optimization platform of claim 1, the cloud server further comprising a service box comprising:
  an adapter for connecting with and receiving the sensor data from a machinery sensor;

a command receiver for receiving a capture command;
a data sync manager for syncing the sensor data;
a collection manager for managing collection of sensor data; and
an adapter manager for managing the adapter.

7. The mobile manufacturing management and optimization platform of claim 1, the push agent comprising:
a push data manager for managing push data; and
a data publisher for publishing the push data to the load balance agent.

8. The mobile manufacturing management and optimization platform of claim 1, the load balance agent comprising:
a selector manager for managing selections; and
a broker manager for managing the message broker.

9. The mobile manufacturing management and optimization platform of claim 1, the message broker comprising: a topic manager for managing a plurality of topics.

10. The mobile manufacturing management and optimization platform of claim 1, the mobile authorization module of the mobile management application comprising:
a device core manager for communicating with the device authorization module; and
a subscribe manager for communicating with the data subscriber.

11. The mobile manufacturing management and optimization platform of claim 1, the application manager of the mobile management application comprising:
a report definer for defining a report;
an application report calculator for assisting the report definer to create the report; and
an application container for wrapping, the mobile management application.

12. A mobile manufacturing management and optimization platform comprising:
a mobile management platform comprising:
a service box, the service box receiving sensor data from mobile manufacturing machinery sensors, the service box including instructions comprising:
an adapter for connecting with and receiving the sensor data;
a command receiver for receiving a capture command from a cloud server;
a data sync manager for syncing the sensor data;
a collection manager for managing collection of sensor data; and
an adapter manager for managing the adapter;
the cloud server, the cloud server receiving sensor data from the service box and using an analysis tool on the sensor data to obtain analysis data, the cloud server storing a platform identification and an authorization manager for managing authorization;
an update agent; and
a push agent comprising instructions comprising:
a push data manager for managing push data; and
a data publisher for publishing the push data to a load balance agent;
a customer management platform comprising a first processor for executing instructions comprising:
a customer management module for managing customers and customer data;
a register manager for managing user registration via the cloud server, the platform identification providing an encrypted topic key to the register manager and the authorization manager managing authorization with the register manager;
device authorization instructions for authorizing a mobile device;
update management instructions for managing updates for the cloud server; and
a customer data database for storing the customer data;
the mobile device comprising:
a mobile management application for communicating with the cloud server, the mobile management application comprising:
a data subscriber;
mobile authorization instructions for interacting with the device;
an application manager for managing settings and configuration of the mobile management application; and
a service dashboard for displaying the analysis data provided by the cloud server; and
an information push platform comprising a second processor for executing instructions comprising:
the load balance agent for receiving the analysis data from the cloud server via the push agent, for controlling data flow between the cloud server and the mobile device, and for receiving updates from the update management module; and
the message broker for transmitting the subscribed topics to the data subscriber and for providing the updates to the cloud server via the update agent.

13. The mobile manufacturing management and optimization platfom of claim 12, the infoimation push platform notifying the cloud server to speed up or slow down data transmission rate or increase or decrease data volume.

14. The mobile manufacturing management and optimization platform of claim 12, the service dashboard comprising a display of available tools, reports, graphs, charts, maps, histories, logs, schedules, quantities, inventories, documents, orders, or projections.

15. The mobile manufacturing management and optimization platform of claim 12, the application manager comprising:
a report definer for defining a report;
an application report calculator for assisting the report definer to create the report; and
an application container for wrapping the mobile management application.

16. The mobile manufacturing management and optimization platform of claim 12, the load balance agent further comprising a selector manager for managing selections.

17. The mobile manufacturing management and optimization platform of claim 12, the message broker further comprising a topic manager for managing topics and a plurality of topics.

* * * * *